(12) United States Patent
Velazquez et al.

(10) Patent No.: US 8,599,718 B2
(45) Date of Patent: Dec. 3, 2013

(54) METHODS AND APPARATUS TO PROVIDE ENHANCED 911 (E911) SERVICES FOR NOMADIC USERS

(75) Inventors: Leonardo Velazquez, Plano, IL (US); Sandra C. Lenhart, Dripping Springs, TX (US); Sudha Gopal, Plano, TX (US); Stephen Rys, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1858 days.

(21) Appl. No.: 11/768,734

(22) Filed: Jun. 26, 2007

(65) Prior Publication Data

US 2009/0003312 A1 Jan. 1, 2009

(51) Int. Cl.
*H04L 12/28* (2006.01)

(52) U.S. Cl.
USPC .......................................... 370/254; 370/392

(58) Field of Classification Search
None
See application file for complete search history.

(56) References Cited

U.S. PATENT DOCUMENTS

| | | | |
|---|---|---|---|
| 6,292,838 B1 * | 9/2001 | Nelson | 709/236 |
| 6,701,348 B2 | 3/2004 | Sommerer | |
| 6,795,537 B1 | 9/2004 | Gilbert | |
| 6,941,139 B1 | 9/2005 | Shupe et al. | |
| 7,027,564 B2 | 4/2006 | James | |
| 7,149,499 B1 | 12/2006 | Oran et al. | |
| 7,177,399 B2 | 2/2007 | Dawson et al. | |
| 2002/0019880 A1 * | 2/2002 | Sakakura | 709/245 |
| 2002/0093943 A1 | 7/2002 | Oliveira | |
| 2003/0043978 A1 * | 3/2003 | Gallagher | 379/88.18 |
| 2004/0157625 A1 | 8/2004 | Gheorghiu et al. | |
| 2005/0063519 A1 | 3/2005 | James | |
| 2005/0083911 A1 * | 4/2005 | Grabelsky et al. | 370/352 |
| 2005/0147058 A1 | 7/2005 | Tarnanen et al. | |
| 2005/0169248 A1 * | 8/2005 | Truesdale et al. | 370/352 |
| 2005/0232164 A1 | 10/2005 | Anzarouth et al. | |
| 2006/0133354 A1 | 6/2006 | Lee | |
| 2006/0245570 A1 | 11/2006 | Pfleging et al. | |
| 2006/0274725 A1 | 12/2006 | Freitag et al. | |
| 2006/0281437 A1 | 12/2006 | Cook | |
| 2007/0055746 A1 | 3/2007 | Oran et al. | |
| 2007/0058613 A1 | 3/2007 | Beckemeyer | |
| 2007/0060097 A1 | 3/2007 | Edge et al. | |
| 2007/0127452 A1 * | 6/2007 | Croy | 370/356 |
| 2007/0177582 A1 | 8/2007 | Croak et al. | |
| 2007/0189466 A1 | 8/2007 | Croak et al. | |

(Continued)

OTHER PUBLICATIONS

U.S. Appl. No. 10/438,666; Title: "Method for Determining the Location of a VoIP End User in Support of Emergency 911 Service"; filed May 15, 2003; Applicants: Barry et al.

(Continued)

*Primary Examiner* — Gregory Sefcheck
*Assistant Examiner* — Daniel Mitchell
(74) *Attorney, Agent, or Firm* — Hanley, Flight & Zimmerman, LLC

(57) ABSTRACT

Methods and apparatus provide enhanced 911 (E911) services for nomadic users are disclosed. An example method comprises receiving an Internet protocol (IP) address associated with a voice over internet protocol (VoIP) device and a media access control (MAC) address associated with the VoIP device, detecting when the VoIP device is outside an access network based on the MAC address and the IP address, prompting a user of the VoIP device to provide geographic location information for the VoIP device when the VoIP device is outside the access network, and updating enhanced 911 (E911) information for the VoIP device based on the geographic location information.

25 Claims, 8 Drawing Sheets

(56) References Cited

U.S. PATENT DOCUMENTS

| | | | |
|---|---|---|---|
| 2007/0189467 A1 | 8/2007 | Croak et al. | |
| 2007/0201433 A1 | 8/2007 | Croak et al. | |
| 2007/0201622 A1 | 8/2007 | Croak et al. | |
| 2008/0065774 A1* | 3/2008 | Keeler | 709/227 |
| 2008/0112329 A1 | 5/2008 | Byers et al. | |
| 2008/0125077 A1* | 5/2008 | Velazquez et al. | 455/404.2 |
| 2008/0181179 A1* | 7/2008 | Karaoguz | 370/331 |
| 2008/0285544 A1 | 11/2008 | Qiu et al. | |

OTHER PUBLICATIONS

U.S. Appl. No. 11/253,900; Title: "Method and Apparatus for Mapping Media Access Control Access Control Addresses to Service Addresses"; filed Oct. 19, 2005; Applicants: Croak et al.

U.S. Appl. No. 11/240,900; Title: "Method and Apparatus for Using a Single Local Phone Number for Routing Out of Area Phone Numbers"; filed Sep. 30, 2005; Applicants: Croak et al.

U.S. Appl. No. 11/264,505; Title: "Method and Apparatus for End-to-End Network Management of E911 Calls"; filed Oct, 31, 2005; Applicants: Croak et al.

U.S. Appl. No. 11/264,506; Title: "Method and Apparatus for Providing Precedence for E911 Calls"; filed Oct. 31, 2005; Applicants: Croak et al.

U.S. Appl. No. 11/264,508; Title: "Method and Apparatus for Supporting E911 Calls in an IP Network"; filed Oct. 31, 2005; Applicants: Croak et al.

U.S. Appl. No. 11/262,659; Title: "Method and Apparatus for Providing E911 Services Via Radio Frequency Identification Tags"; filed Oct. 31, 2005; Applicants: Croak et al.

U.S. Appl. No. 11/263,489; Title: "Method and Apparatus for Providing Dedicated Emergency Signaling Message Set"; filed Oct. 31, 2005; Applicants: Croak et al.

U.S. Appl. No. 11/263,026; Title: "Method and Apparatus for Providing Rerouting of a Failed Emergency Call"; filed Oct. 31, 2005; Applicants: Croak et al.

U.S. Appl. No. 11/322,454; Title: "Method and Apparatus for Re-Originating Emergency Calls on Failure Conditions"; filed Dec. 31, 2005; Applicants: Croak et al.

U.S. Appl. No. 11/323,021; Title: "Method and Apparatus for Enabling Diverse Paths Between Selective Routers"; filed Dec. 30, 2005; Applicants: Croak et al.

U.S. Appl. No. 11/323,211; Title: "Method and Apparatus for Providing End to End Emergency Call Answer Supervision"; filed Dec. 31, 2005; Applicants: Croak et al.

U.S. Appl. No. 11/322,522; Title: "Method and Apparatus for Providing Automatic Crankback for Emergency Calls"; filed Dec. 31, 2005; Applicants: Croak et al.

U.S. Appl. No. 11/322,453; Title: "Method and Apparatus for Supporting Out of Area Phone Number for Emergency Services"; filed Dec. 31, 2005; Applicants: Croak et al.

* cited by examiner

METHODS AND APPARATUS TO PROVIDE
ENHANCED 911 (E911) SERVICES FOR
NOMADIC USERS

FIELD OF THE DISCLOSURE

This disclosure relates generally to enhanced 911 (E911) services and, more particularly, to methods and apparatus to provide E911 services for nomadic users.

BACKGROUND

Internet protocol-enabled telecommunication providers in the United States are required by the Federal Communications Commission (FCC) to support enhanced 911 (E911) emergency call services. That is, when a telephone user dials 9-1-1, the telecommunication carrier must be able to process the call to determine the geographic location from where the call originated to enable dispatching of emergency personnel to the location of the 911 caller. Enhanced 911 service differs from traditional (e.g., non-enhanced) 911 service in that E911 service routes an emergency call to a 911 dispatcher and provides the dispatcher with the geographic location (e.g., street address) from which the call was originated. While traditional 911 services route an emergency call to a 911 dispatcher, it does so without providing the dispatcher with geographic location information indicating where the call originated.

In traditional public switched telephone networks (PSTN), the geographic information retrieval support for E911 is implemented via fixed associations of wire line telephone numbers to geographic street addresses. Telecommunication providers usually store a subscriber's location (e.g., a street address) in a database associated with an assigned telephone number (e.g., a call back number (CBN)) during the service activation. When a PSTN user makes a 911 call, the telephone number of the caller making the 911 call (i.e., the CBN) can be used to look up the geographic location of the caller, and the retrieved location information can be used to dispatch emergency personnel to the caller.

The introduction of voice over IP (VoIP) technology introduces various challenges to service providers seeking to support E911 services. In particular, under a nomadic service (e.g., a service that allows a subscriber to connect a VoIP telephone at various network locations), a VoIP subscriber can easily disconnect a VoIP telephone from one location (e.g., the subscriber's home and/or workplace), connect the VoIP telephone in another location (e.g., a visited local area network (LAN), a coffee shop, a vacation spot, etc.), and register the VoIP telephone with the VoIP service provider to enable the subscriber to place telephone calls from the other location. This nomadic capability of VoIP phones introduces the potential for inaccurate associations between telephone numbers and physical and/or geographic locations.

DETAILED DESCRIPTION

Figure 1:
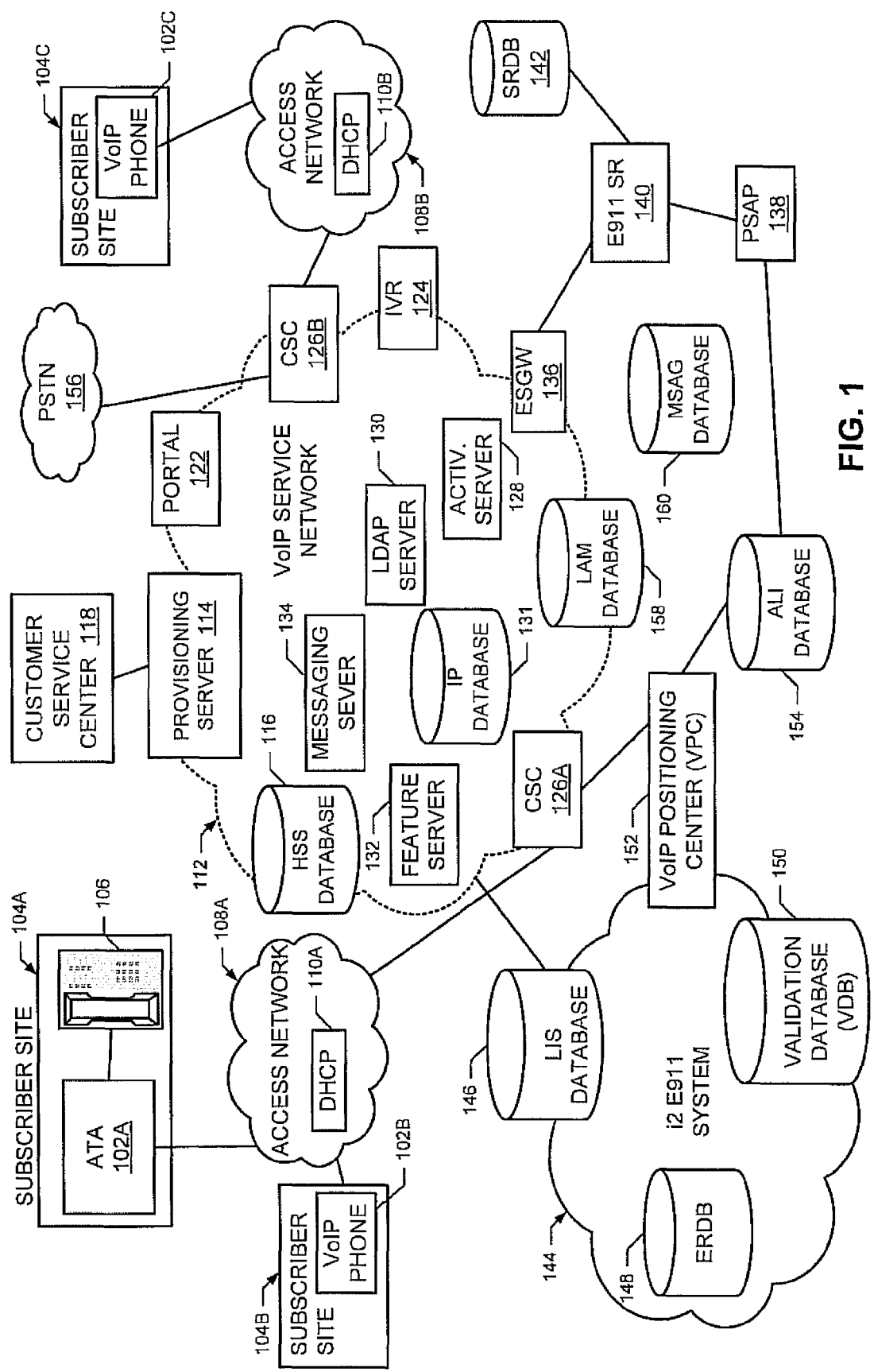
FIG. 1 is a schematic illustration of an example voice over Internet protocol (VoIP) based communication system constructed in accordance with the teachings of the invention.

Methods and apparatus to provide enhanced 911 (E911) services for nomadic users are disclosed. A disclosed example method includes receiving an Internet protocol (IP) address associated with a voice over internet protocol (VoIP) device and a media access control (MAC) address associated with the VoIP device, detecting when the VoIP device is outside an access network based on the MAC address and the IP address, prompting a user of the VoIP device to provide geographic location information for the VoIP device when the VoIP device is outside the access network, and updating enhanced 911 (E911) information for the VoIP device based on the geographic location information. Another disclosed example method includes receiving an Internet protocol (IP) address associated with a voice over internet protocol (VoIP) device and a MAC address associated with the VoIP device, detecting when the VoIP device is inside an access network based on the MAC address and the IP address, and automatically updating enhanced 911 (E911) information for the VoIP device based on the IP address when the VoIP device is inside the access network.

A disclosed example apparatus includes a protocol messaging interface to receive an Internet protocol (IP) address associated with a voice over internet protocol (VoIP) device and a media access control (MAC) address of the VoIP device, a location identifier to detect when the VoIP device is outside an access network based on the MAC address and the IP address, a user interface to prompt a user of the VoIP device to provide geographic location information for the VoIP device when the VoIP device is outside the access network, and a location information server (LIS) database interface to update enhanced 911 (E911) information for the VoIP device based on the geographic location information.

In the interest of brevity and clarity, throughout the following disclosure references will be made to the example Internet protocol (IP) Multimedia subsystem (IMS) based voice over IP (VoIP) communication system, the example VoIP service network 112, the example access networks 108A and 108B, the example activation server 128, the example LDAP server 130, the example provisioning server 114, the example feature server 132, the example messaging server 134, and/or the example VoIP devices 102A-C of FIG. 1. Moreover, the following disclosure will utilize SIP messages and/or message exchanges. However, it should be understood that the methods and apparatus described herein to provide enhanced 911 (E911) services are applicable to other VoIP communication systems and/or networks (e.g., based on soft switches), VoIP devices, IMS devices, feature servers, messaging servers, access networks, IP networks, IMS networks and/or IMS communication systems, and/or other types of protocols, messages, and/or message exchanges.

FIG. 1 is a schematic illustration of an example IMS based VoIP communication system that includes any number and/or type(s) of VoIP devices, three of which are designated at reference numerals 102A, 102B and 102C. Example VoIP devices 102A-C include, but are not limited to, a VoIP phone, a residential gateway, a VoIP enabled personal computer (PC), a VoIP endpoint, a wireless VoIP device (e.g., a wireless-fidelity (WiFi) Internet protocol (IP) phone), a VoIP adapter (e.g., an analog telephone adapter (ATA)), a VoIP enabled personal digital assistant (PDA), a VoIP based payphone, and/or a VoIP kiosk. The example VoIP devices 102A-C of FIG. 1 may be implemented and/or be found at any number and/or type(s) of locations, three of which are designated in FIG. 1 with reference numerals 104A, 104B and 104C. Further, the example VoIP devices 102A-C may be fixed location devices, substantially fixed location devices and/or mobile devices. Moreover, the VoIP devices 102A-C may have equipment communicatively and/or electrically coupled to them. For example, an IMS ATA 102A may be coupled to a telephone 106, and/or a residential gateway may be coupled to a PC and/or set-top box (not shown). Because the VoIP devices 102A-C may be mobile and/or move from location to location, the example VoIP service network 112 of FIG. 1 implements methods and/or apparatus that allow the VoIP service network 112 to automatically determine and/or to obtain the geographic location of the VoIP devices 102A-C so that E911 services can be enabled and/or provided for the VoIP devices 102A-C. An example manner of implementing any or all of the example VoIP devices 102A-C of FIG. 1 is described below in connection with FIG. 3.

To access IMS communication services throughout and/or within a site, location, building, geographic area and/or geographic region, the example IMS based VoIP communication system of FIG. 1 includes any number and/or type(s) of access networks, two of which are designated in FIG. 1 with reference numbers 108A and 108B. In general, the example access networks 108A and 108B of FIG. 1 provide and/or facilitate a communicative coupling of the VoIP devices 102A-C to and/or with a VoIP service network 112 (e.g., an IMS based VoIP service network), which provides and/or enables VoIP and/or IMS communication services (e.g., telephone services, Internet services, data services, messaging services, instant messaging services, electronic mail (email) services, chat services, video services, audio services, gaming services, voicemail, facsimile services, etc.) to the VoIP devices 102A-C. The example access networks 108A and 108B can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

While in the illustrated example of FIG. 1, each of the example VoIP devices 102A-C are depicted as having an associated access network 108A, 108B, such depictions are merely illustrative. For example, an IMS device 102A-C may be configured and/or capable to utilize more than one access network 108A, 108B at the same and/or different times (e.g., be associated with a nomadic subscriber of the example VoIP service network 112).

The example VoIP devices 102A-C of FIG. 1 can be associated with a non-nomadic service (i.e., a roaming-blocked service) and/or a nomadic service (i.e., a roaming-enabled service). A non-nomadic service limits a particular VoIP device 102A-C to making and/or receiving VoIP calls from only a pre-selected network location (e.g., from only the example subscriber site 104A). In contrast, a nomadic service allows a given VoIP device 102A-C to make calls from a plurality of subscribe sites and/or network locations (e.g., from any or all of the example subscriber sites 104A-C). In some examples, a subscriber and/or user is allowed to change the nomadic option for their VoIP device 102A-C via, for example, a user account configuration web-page.

In some examples, the VoIP devices 102A-C of FIG. 1 may be communicatively coupled to the access networks 108A and 108B via one or more additional Internet protocol (IP) based networks and/or devices (not shown), such as a local area network (LAN), a gateway and/or a router located within a place of business, a school and/or a residence. The example VoIP devices 102A-C are communicatively coupled to the example access networks 108A and 108B and/or, more generally, the example VoIP service network 112 via any number and/or type(s) of past, current and/or future communication network(s), communication system(s), communication device(s), transmission path(s), protocol(s), technique(s), specification(s) and/or standard(s). For instance, the example VoIP devices 102A-C may be coupled to the example access networks 108A and 108B and/or the example VoIP service network 112 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Moreover, any or all of the example VoIP service network 112 and/or the example access networks 108A and 108B of FIG. 1 may extend geographically to include one or more locations near to and/or encompassing one or more of the example subscriber sites 104A-C. For example, the access network 108A may include a wireless access point (not shown) by which, for example, a WiFi IP phone 102B connects to the access network 108A and the VoIP service network 112.

To provide IP addresses to the VoIP devices 102A-C, each of the example access networks 108A and 108B of FIG. 1 includes one or more domain host configuration protocol (DHCP) servers, two of which are designated in FIG. 1 with reference numerals 110A and 110B. The example DHCP servers 110A and 110B of FIG. 1 manage, allocate and/or assign IP addresses for devices (e.g., the VoIP device 102A-C) that are utilizing the DHCP server's associated access network 108A, 108B to access the IP network 112 and/or, more generally, the public Internet. When a VoIP device 102A-C becomes communicatively coupled to an access network 108A, 108B (e.g., to seek access to the example VoIP service network 112), a DHCP server 110A, 110B associated with the access network 108A, 108B assigns an IP address to the VoIP device 102A-C. The assigned IP address is used by the VoIP device 102A-C and/or by one or more devices to which the VoIP device 102A-C is communicatively coupled (e.g., a device of the VoIP service network 112) to facilitate communication between the VoIP device 102A-C and the coupled device(s).

Service providers associated with the example access networks 110A and 110B are generally aware of the ingress and the egress points of their owned access network 110A, 110B, the service provider(s) and/or the access network(s) 110A, 110B itself can determine and/or estimate the geographic location of IP based devices that have been assigned IP addresses by the access network(s) 110A, 110B. For example, if an access network 108A, 108B includes a wireless access point (not shown) via which an IP address has been assigned to a particular IP based device, the access network 108A, 108B can reasonably expect that the particular IP based device is located in the vicinity of the wireless access point. If another device is coupled to an access network 108A, 108B via a customer-premises DSL modem and/or residential gateway, the access network 108A, 108B can reasonably expect that the IP based device is located in the vicinity of the DSL modem and/or the residential gateway (e.g., within the same residence and/or place of business).

In the example IMS based VoIP communication system of FIG. 1, the example access networks 108A and 108B and the VoIP service network 112 need not be owned, implemented, and/or operated by the same service provider. For example, the VoIP devices 102A-C may access IMS services provided by an VoIP service network 112 owned, operated and/or implemented by a first service provider via access networks 108A and 108B, which are owned, operated and/or implemented by one or more additional service providers. However, any or all of the access networks 108A and 108B, and/or the VoIP service network 112 may be operated by a single service provider.

As described more fully below, the example VoIP service network 112 of FIG. 1 uses an IP address assigned to a VoIP device 102A-C to determine and/or estimate the geographic location of the VoIP device 102A-C in order to provide and/or enable E911 services for the VoIP device 102A-C. When an access network (e.g., the example access network 108A) used by a VoIP device 102A-C to access the VoIP service network 112 is owned and/or operated by the same service provider owning and/or operating the VoIP service network 112, the example VoIP service network 112 of FIG. 1 can, based on the IP address assigned to a VoIP device 102A-C, automatically determine (e.g., estimate) the geographic location of the VoIP device 102A-C and use the same to provide and/or enable E911 services for the VoIP device 102A-C. This is particularly useful in providing E911 services to VoIP users who may roam through the network using an access network 108A that is also operated by the operated of the VoIP service network 112.

However, when the VoIP device 102A-C is not assigned an IP address by an access network (e.g., the example access network 108B) that is owned and/or operated by the same service provider owning and/or operating the VoIP service network 112, the example VoIP service network 112 of FIG. 1 may not be able to automatically determine (e.g., estimate) the geographic location of the VoIP device 102A-C. Accordingly, when the example VoIP service network 112 is not able to automatically determine the geographic location of the VoIP device 102A-C, the VoIP service network 112 prompts a user of the VoIP device 102A-C to provide, indicate and/or select (e.g., from a list of previously provided locations) their geographic location. Additionally or alternatively, an access network that is not owned and/or operated by the same service provider owning and/or operating the VoIP service network 112 (e.g., the example access network 108B) may be able to share and/or provide data and/or information representative of associations of IP addresses to geographic locations with the VoIP service network 112. Such shared and/or provided geographic location information could be used by the VoIP service network 112 to automatically determine the location of VoIP devices served by access networks that are not commonly owned and/or operated with the VoIP service network 112.

Once the geographic location is automatically determined or the user provides, indicates and/or selects a geographic location, the example VoIP service network 112 provides and/or enables E911 services for the VoIP device 102A-C. In general, the example VoIP service network 112 of FIG. 1 determines whether a VoIP device 102A-C is currently located inside an access network 108A, 108B owned and/or operated by the service provider of the VoIP service network 112 (e.g., is using an IP address assigned by the access network 108A, 108B), and then based on the determination either automatically updates E911 information for the VoIP device 102A-C or prompts a user of the VoIP device 102A-C to provide geographic location information.

Other example methods and apparatus to update geographic location information for VoIP devices are described in U.S. patent application Ser. No. 11/462,576, entitled "Methods and Apparatus to Update Geographic Location Information Associated with Internet Protocol Devices for E-911 Emergency Services," and filed on Aug. 4, 2006; and U.S. patent application Ser. No. 11/676,877, entitled "Systems and Methods for Location Management and Emergency Support for a Voice Over Internet Protocol Device," and filed on Feb. 20, 2007. U.S. patent application Ser. No. 11/462,576 and U.S. patent application Ser. No. 11/676,877 are hereby incorporated by reference in their entireties.

To manage subscriber services, the example VoIP service network 112 of FIG. 1 includes a provisioning server 114 that is communicatively coupled to a home subscriber services (HSS) database 116. The example provisioning server 114 of FIG. 1 is used to manage and/or track which subscribers have subscribed to which features and/or services, and/or to enable access to those features by subscribers. The example provisioning server 114 stores records in the example HSS database 116 having VoIP device configuration information indicative of subscriber's respective features and/or services. To implement a service change (e.g., provisioning, a device registration, an upgrade, an update, etc.), the example provisioning server 114 is notified of the service change, and the provisioning server 114 stores and/or updates information in the HSS database 116 indicative of the service change. In the illustrated example, the provisioning server 114 is also configured to receive and/or process the initial geographic location information (e.g., street addresses) associated with a VoIP device (e.g., one of the example VoIP devices 102A-C) when VoIP service is initially provisioned. Moreover, the provisioning server 114 is configured to store geographic address lists (e.g., the example geographic address list 400 of FIG. 4) corresponding to different VoIP devices 102A-C.

The example provisioning server 114 of FIG. 1 is configured to communicate configuration updates including address list updates to the VoIP devices 102A-C. For example, if the example provisioning server 114 receives a notification that a new service feature has been enabled for the subscriber account associated with a particular VoIP device 102A-C, the provisioning server 114 can communicate a configuration update (e.g., transmit an updated configuration file) to the VoIP device 102A-C. Additionally, when a user provides a new geographic address for storage in an address list (e.g., the example geographic address list 302A of FIG. 3) associated with the VoIP device 102A-C, the example provisioning server 114 communicates the updated geographic address information to the VoIP device 102A-C. Additionally or alternatively, geographic address information may be stored by and/or at the VoIP device 102A-C as and/or when the VoIP device 102A-C is used to provide geographic location information to the VoIP service network 112. For example, when a user interface of the VoIP device 102A-C is used to prompt a user for geographic location information, the VoIP device 102A-C can store the provided geographic location information and then send the same to the VoIP service network 112.

To allow subscribers to interact with customer service representatives, the example IMS network 112 of FIG. 1 is coupled to and/or includes a customer service center 118. In the illustrated example of FIG. 1, a subscriber can interact with a customer service representative at the customer service center 118 to change a nomadic option associated with a particular VoIP device 102A-C (e.g., enable and/or disable a nomadic service). In addition, when the VoIP device 102A-C is moved to a different geographic location, the subscriber can interact with the customer service representative to provide the street address of the new geographic location.

To enable a subscriber to change nomadic options, and/or to provide and/or select the street address of current geographic location, the example VoIP service network 112 of FIG. 1 includes a portal 122 and/or an interactive voice response (IVR) system 124. The example portal 122 of FIG. 1 comprises one or more web-based interfaces (e.g., one or more web pages) that can be accessed and/or used by subscribers and/or customer service agents to update, provide and/or select subscriber information such as, for example, geographic address information. Likewise, the example IVR system 124 of FIG. 1 can be accessed and/or used by subscribers and/or customer service agents to update, provide and/or select such subscriber information. The example portal 122 and/or the example IVR 124 may be used to, for example, populate the example geographic addresses 305 and/or the example geographic address list 310 of FIGS. 3 and/or 4. For example, a subscriber can pre-populate their associated geographic address list with a set of roaming locations such that when they roam they can simply select a geographic location from the set of pre-registered locations. Additionally or alternatively, the example IVR system 124 may be used to inform a subscriber of a suspected geographic location change. For example, when a subscriber initiates a VoIP call via a VoIP device 102A-C, the IVR system 124 can playback an audio message via the VoIP device 102A-C (e.g., notifying them that E911 services are currently disabled) when the VoIP service network 112 detects that the VoIP device 102A-C may have been moved to a different geographic location 104A-C and/or is now associated with a different access network 108A, 108B (e.g., an access network owned and/or operated by a different service provider than the service provider operating and/or owning the VoIP service network 112). An example IVR system 124 includes a sound file player and/or a text-to-speech converter (e.g., a speech synthesizer) to present one or more audio messages, and/or one or more dual-tone multiple-frequency (DTMF) decoders and/or voice recognition modules to receive user inputs and/or selections.

To control and/or process communication sessions, the example VoIP service network 112 of FIG. 1 includes one or more call session controllers (CSC), two of which are designated in FIG. 1 with reference numerals 126A and 126B. The example call session controllers 126A and 126B of FIG. 1 implement and/or perform call session control functions (CSCF) that determine how and/or whether a call should be established, and/or which features and/or services should be used to establish the call based on subscribed features and/or services (e.g., nomadic-enabled service, calls to a PSTN allowed, etc.) of a subscriber. The example call session controllers 126A and 126B include and/or may implement one or more proxy CSCF (P-SCSF) servers, one or more interrogating CSCF (I-CSCF) servers, one or more serving CSCF (S-CSCF) servers, and/or one or more media gateways.

To activate and/or configure VoIP devices (e.g., any of the example VoIP device 102A-C), the example VoIP service network 112 of FIG. 1 includes an activation server 128. In some examples, the example activation server 128 of FIG. 1 is implemented by an S-CSCF server implemented by and/or within a CSC 126A, 126B. When a VoIP device 120A-C communicates a registration request message to the example VoIP service network 112, the example activation server 128 of FIG. 1 performs a registration using the session initiation protocol (SIP). As described below in connection with the example message protocol exchanges and/or the example machine accessible instructions of FIGS. 5-7, the example activation sever 128 is programmed and/or configured to determine whether a registering VoIP device 102A-C is associated with an access network owned and/or operated by the service provider of the VoIP service network 112. When the registering VoIP device 102A-C is associated with an access network owned and/or operated by the service provider of the VoIP service network 112, the activation server 128 automatically determines the geographic location of the VoIP device 102A-C based on its assigned IP address. However, when the registering VoIP device 102A-C is not associated with an access network owned and/or operated by the service provider of the VoIP service network 112, the activation server 128 notifies the VoIP device 102A-C and/or its user that E911 services are not currently active for the VoIP device 102A-C, and prompts the user to provide, identify and/or select the current geographic location of the VoIP device 102A-C. When obtained (e.g., through prompting a user of the VoIP device 102A-C) and/or automatically determined (e.g., based on the IP address of the VoIP device 102A-C), the example activation server 128 provides the geographic location of the VoIP device 102A-C to a location assistant for VoIP mobility (LAM) database 158.

To determine when a VoIP device 102A-C has changed its location, the example activation server 128 compares the current IP address assigned to the VoIP device 102A-C (e.g., as received and/or determined from a received SIP REGISTER message) with the most recent IP address assigned to the VoIP device 102A-C. For example, if the activation server 128 maintains a data structure that associates IP addresses with VoIP device media access control (MAC) addresses, the most recent IP address of the VoIP device 102A-C can be determined by, for example, performing a lookup of the data structure based on the MAC address of the VoIP device 102A-C. If the current and the most recent IP addresses are the same, the example activation server 128 of FIG. 1 assumes that the VoIP device 102A-C has the same geographic location. If the current and the most recent IP addresses are different, the example activation server 128 determines that the VoIP device 102A-C has a new geographic location (e.g., communicatively coupled to a different WLAN access point as they move within a building). The activation server 128 then determines whether the current IP address is associated with an access network 108A, 108B for which the VoIP service network 112 can automatically determine the geographic location associated with the IP address.

To perform a lookup based on a VoIP device's current IP address, the example VoIP service network 112 of FIG. 1 includes a lightweight directory access protocol (LDAP) server 130. The example LDAP server 130 of FIG. 1 performs a lookup and/or a query of a database 131 that associates IP addresses with known geographic locations. An example IP database 131 of FIG. 1 is a list of IP addresses and associated geographic locations. In some examples, the IP database 131 only includes IP addresses assigned by the VoIP service network 112 and/or any access networks 108A, 108B owned, operated and/or associated (e.g., owned, operated and/or associated with a business partner and/or subsidiary) with the VoIP service network 112. If the example LDAP server 130 locates the current IP address of the VoIP device 102A-C in the IP database 131, then the example activation server 128 of FIG. 1 automatically updates the geographic location of the VoIP device 102A-C in the LAM database 158 and/or in a location identification server (LIS) database 146. If the example LDAP server 130 cannot locate the current IP address of the VoIP device 102A-C in the IP database 131 (and responds with an indication of the same to the activation server 128), then the example activation server 128 prompts the user of the VoIP device 102A-C to provide and/or select a current geographic location. When the current geographic location of the VoIP device 102A-C is received, the activation server 128 updates the geographic location of the VoIP device 102A-C in the LAM database 158 and/or in a location identification server (LIS) database 146 so that E911 services can be provided to the VoIP device 102A-C.

To provide one or more additional call features, the example VoIP service network 112 of FIG. 1 includes any number and/or type(s) of features servers (one of which is designated in FIG. 1 with reference numeral 132) and/or one or more messaging servers (one of which is designated in FIG. 1 with reference numeral 134). The example feature server 132 and/or the example messaging server 134 of FIG. 1 provide and/or implement one or more additional service features for and/or on behalf of subscribers (e.g., providing roaming notifications, voicemail, announcement servers, call trees, etc.).

To route emergency calls, the example VoIP service network 112 of FIG. 1 includes an emergency services gateway (ESGW) 136. The example emergency services gateway 136 of FIG. 1 uses information received via an emergency call's call setup signaling to determine a path (e.g., a trunk) via which to route the emergency call for E911 handling.

To handle emergency calls, the example communication system of FIG. 1 includes a public safety answering point (PSAP) 138. The example PSAP 138 of FIG. 1 corresponds to a particular geographic area, and dispatchers at the PSAP 138 handle emergency calls originating from VoIP devices within that geographic area. In this manner, dispatchers can dispatch emergency services personnel from a location nearest the geographic location of a 911 caller. Although one PSAP is shown in the example of FIG. 1, the example system may implement and/or include any number of PSAP's, each corresponding to one or more respective geographic area(s).

To route emergency calls from the ESGW 136 to the PSAP 138, the example communication system of FIG. 1 includes a 911 selective router 140. The example 911 selective router 140 of FIG. 1 routes emergency calls to the correct PSAP 138 based on information received from the ESGW 136 and a selective routing database (SRDB) 142. For example, during an emergency call, the ESGW 136 communicates an emergency services query key (ESQK) to the 911 selective router 140. The ESQK is a call identifier that represents an emergency call for the duration of the call and is used by the example selective router 140 to route an emergency call to the correct PSAP (e.g., the PSAP 138).

When the example 911 selective router 136 of FIG. 1 receives an ESQK from the emergency services gateway 136, the example 911 selective router 140 forwards the ESQK to the SRDB 142 to obtain an emergency service number (ESN) identifying a PSAP to which to route the emergency call. The example SRDB 142 of FIG. 1 stores associations of ESQK's to ESN's. An ESN is a number used to indicate a particular group of emergency service agencies (e.g., police department, fire department, medical agency) that serves a particular geographic area and facilitates routing an emergency call to the PSAP 138 that serves that geographic area.

To enable the example communication system of FIG. 1 to implement operations associated with receiving and/or processing emergency calls made from VoIP devices (e.g., the VoIP device 102A-C), the example communication system includes an interim phase 2 (i2) E911 system 144. To store street addresses in association with respective VoIP device telephone numbers and/or to determine whether a call is originating from a geographic area in which a corresponding VoIP service provider can provide E911 services, the example i2 E911 system 144 of FIG. 1 includes the example location identification server (LIS) database 146. The example LIS database 146 of FIG. 1 stores a record for each VoIP telephone number, and each record is used to store the geographic location (e.g., the street address) of the subscriber site 104A-C that is currently associated with the telephone number in that record. The example provisioning server 114 of FIG. 1 communicates initial geographic location information (e.g., initial street addresses) to the LIS database 146 during initial VoIP subscription enrollments. In addition, when a VoIP device 102A-C moves to another geographic location and as described above, the example activation server 128 of FIG. 1 communicates the updated street address to the LIS database 142.

The example i2 E911 system 140 of FIG. 1 also includes an emergency services zone (ESZ) routing database (ERDB) 148. Each ESZ corresponds to a particular emergency service number (ESN) that uniquely identifies the ESZ. For each ESZ, the ERDB 148 stores an emergency services routing number (ESRN) corresponding to an E911 selective router 140 that serves that ESZ and a respective ESN. In the illustrated example, an ESRN is used to route an emergency call to an E911 selective router 140 serving the ESZ corresponding to the geographic area within which the emergency call originated.

When a subscriber provides a geographic location (e.g., a street address), the LIS database 146 uses the ESRN's stored in the ERDB 148 to determine whether the provided street address is located within an area in which a corresponding VoIP service provider can provide E911 service. For example, the LIS database 146 accesses the ERDB 148 to retrieve an ESRN corresponding to the provided street address and determines whether the VoIP service provider can provide E911 service to the provided street address based on the ESRN. Regardless of whether the LIS database 146 determines that the VoIP service provider can or cannot provide E911 service to the provided street address, the LIS database 146 updates the registered geographic location of the VoIP device 102A-C with the provided street address. However, if the LIS database 146 determines that the VoIP service provider cannot provide E911 service to the provided street address, the LIS database 146 informs the provisioning server 114 that the VoIP device 102A-C is in a location at which E911 service is not available. In this manner, the example provisioning server 114 of FIG. 1 can, for example, instruct the example feature server 132 to set the operating mode associated with the VoIP device 102A-C to a restricted mode so that the VoIP device 102A-C can access only a subset of services (e.g., receive calls only and/or connect to a 911 dispatcher without the location-identification services of E911) that are, for example, associated with a service subscription corresponding to the VoIP device 102A-C.

To validate geographic location information (street addresses) to be stored in the LIS database 146, the example i2 E911 system 140 of FIG. 1 includes a validation database (VDB) 150. The example VDB 150 of FIG. 1 stores a plurality of street addresses in a format that is, for example, implemented in accordance with a master street address guide (MSAG) standard. In the illustrated example, when a subscriber provides a street address, and before the street address is stored in the LIS database 146, the example i2 E911 system 144 compares the user-provided street addresses with known street addresses in the VDB 150 to determine whether the provided street address is MSAG-valid. If the provided street address is MSAG-valid, then the i2 E911 system 144 validates the provided street address and updates a corresponding registered street address in the LIS database 146. Otherwise, if the provided street address is not MSAG-valid (e.g., the address includes a typographical error, an incorrect zip code, etc.), the i2 E911 system 144 indicates that the provided street address is invalid, and the example VoIP service network 112 informs the subscriber of the invalidity and requests the user to provide a MSAG-valid street address.

To retrieve emergency call routing information from the example ERDB 148 and street addresses from the LIS database 146 to process an emergency call, the example i2 E911 system 144 of FIG. 1 includes a VoIP positioning center (VPC) 152. The example VPC 152 of FIG. 1 is communicatively coupled to a CSC (e.g., the example CSC 126A). When the CSC receives an emergency call, the CSC queries the VPC 152 to determine the E911 selective router 140 to which the ESGW 136 should route the emergency call.

The example PSAP 134 of FIG. 1 is coupled to an automatic location identification (ALI) database 154 to enable the PSAP 138 to retrieve a geographic street address from which an emergency call originated. The example ALI database 154 of FIG. 1 stores geographic street addresses corresponding to the locations of telephones connected to a traditional PSTN 156. When the example PSAP 138 of FIG. 1 requires a street address of a VoIP device 102A-C, the ALI database 154 queries the VPC 152 for the street address. In response, the example VPC 152 returns the street address associated with the VoIP device 102A-C to the ALI database 154. The example ALI database 154 then provides the street address to the PSAP 138.

To store data records of geographic location information including geographic addresses corresponding to locations that subscribers have visited and/or may visit in the future, the example VoIP service network 112 of FIG. 1 includes the example Location Assistant for VoIP Mobility (LAM) database 158. The example LAM database 158 of FIG. 1 is configured to store one or more geographic address data records for each VoIP subscriber. Some subscribers may choose to submit geographic addresses corresponding to the places that they most frequently visit such as, for example, a home address, an office address, a coffee shop address, etc. and/or the list of addresses may be compiled over time. An example data structure that may be used to implement the example LAM database 158 of FIG. 1 is described below in connection with FIG. 4.

The example LAM database 158 of FIG. 1 is provided with a hypertext transfer protocol over secure socket layer (HTTPS) interface to enable subscribers and/or customer service representatives to access and modify geographic addresses securely via the Internet (e.g., via the example portal 122) and/or via a voice response system (e.g., the example IVR 124). A subscriber may provide geographic addresses to the LAM database 158, and/or set and/or select a current geographic address previously stored in the LAM database 158. Additionally or alternatively, the subscriber may contact a customer service agent at the customer service center 118 and speak a geographic address to be added to the LAM database 158 and/or speak a current geographic address selection. The customer service agent, in turn, can add the new geographic address in the LAM database 158 and/or set the selected current geographic address in the LAM database 158 via a customer service agent interface (e.g., a database interface, an intranet website, an internet website, a subscriber account information interface, etc.).

The example LAM database 158 of FIG. 1 is configured to communicate geographic addresses to the provisioning server 114 (FIG. 1) to enable the provisioning server 114 to store address lists of respective users. In this manner, the provisioning server 114 can communicate the address lists and any updates (e.g., address additions, address deletions, address modifications, etc.) thereto to respective VoIP devices (e.g., the VoIP device 102A-C). The VoIP devices 102A-C store their respective address lists and/or are configured to present the geographic addresses in the address lists to their corresponding users as selectable choices that the user can select to indicate a current geographic address. In some example implementations, a VoIP device 102A-C may be configured to request an address list update during a boot up process prior to requesting to be registered with the VoIP service network 112. In other example implementations, after registration, the VoIP device 102A-C may periodically or aperiodically query the provisioning server 114 for updates to the configuration file and/or the address list.

In some example implementations, the LAM database 158 is configured to receive geographic address information from a user before the user operates the respective VoIP device 102A-C at the provided geographic address. For example, a user may proactively provide geographic addresses of the locations at which the user foresees using his/her VoIP device 102A-C. Additionally or alternatively, the LAM database 158 may be configured to store geographic addresses automatically when subscribers provide current geographic address information each time they operate their VoIP device 102A-C at a new location. For example, a user may provide a current geographic address when the network prompts the user, and the LAM database 158 can record or store the provided current geographic address in a geographic address data record corresponding to that subscriber. In this manner, the quantity of geographic address entries in the subscriber's address list increases each time the subscriber uses his/her VoIP device 102A-C at a new location and provides a current geographic address. When the user moves the VoIP device 102A-C from one location to another and powers on the VoIP device 102A-C, the VoIP device 102A-C can present the list of automatically compiled geographic addresses. If the current location of the VoIP device 102A-C is one in which the user previously used the VoIP device 102A-C, the geographic address of the current location will appear in the list of addresses presented by the VoIP device 102A-C and will be capable of being selected as the current geographic address. However, if the current location of the VoIP device 102A-C is one in which the user has not previously used the VoIP device 102A-C and the user has not otherwise provided the geographic address of the current location to the LAM database 158 (via, for example, a website), the user will need to provide the geographic address of the current location via, for example, the example portal 122, a customer service agent, the example IVR 124, a VoIP device user interface, etc.

To validate geographic location information (street addresses) to be stored in the LAM database 158, the example VoIP service network 112 of FIG. 1 includes a master street address guide (MSAG) database 160. The example MSAG database 160 of FIG. 1 is configured to store a plurality of street addresses in, for example, a data structure implemented in accordance with an MSAG standard. In the illustrated example, when a subscriber provides a street address, and the street address is stored in the LAM database 158, the LAM database 158 compares the user-provided street addresses with known street addresses in the MSAG database 160 to determine whether the provided street address is MSAG-valid. If the provided street address is MSAG-valid, then the LAM database 158 indicates the provided street address as validated and updates an address list for the corresponding user to include the validated street address. Otherwise, if the provided street address is not MSAG-valid (e.g., the address includes a typographical error, an incorrect zip code, etc.), the LAM database 158 indicates that the provided street address is not validated. The user is then able to access the provided street address via the example portal 122 and/or the example IVR 124 to correct, delete, or replace the invalid street address.

While an example IMS based VoIP communication system, example VoIP devices 102A-C, example access networks 108A and 108B, and an example VoIP service network 112 have been illustrated in FIG. 1, the devices, servers, databases, networks, systems, gateways, portals, and/or processors illustrated in FIG. 1 may be combined, divided, re-arranged, eliminated and/or implemented in any way. Further, any or all of the example devices, servers, databases, networks, systems, gateways, portals, and/or processors of FIG. 1 may be implemented by hardware, software, firmware and/or any combination of hardware, software and/or firmware. Further still, the example system of FIG. 1, the example access networks 108A and 108B, the example VoIP service network 112 may include additional devices, servers, systems, networks, gateways, portals, and/or processors in addition to, or instead of, those illustrated in FIG. 1, and/or may include more than one of any or all of the illustrated devices, servers, databases, networks, systems, gateways, portals, and/or processors.

Figure 2:
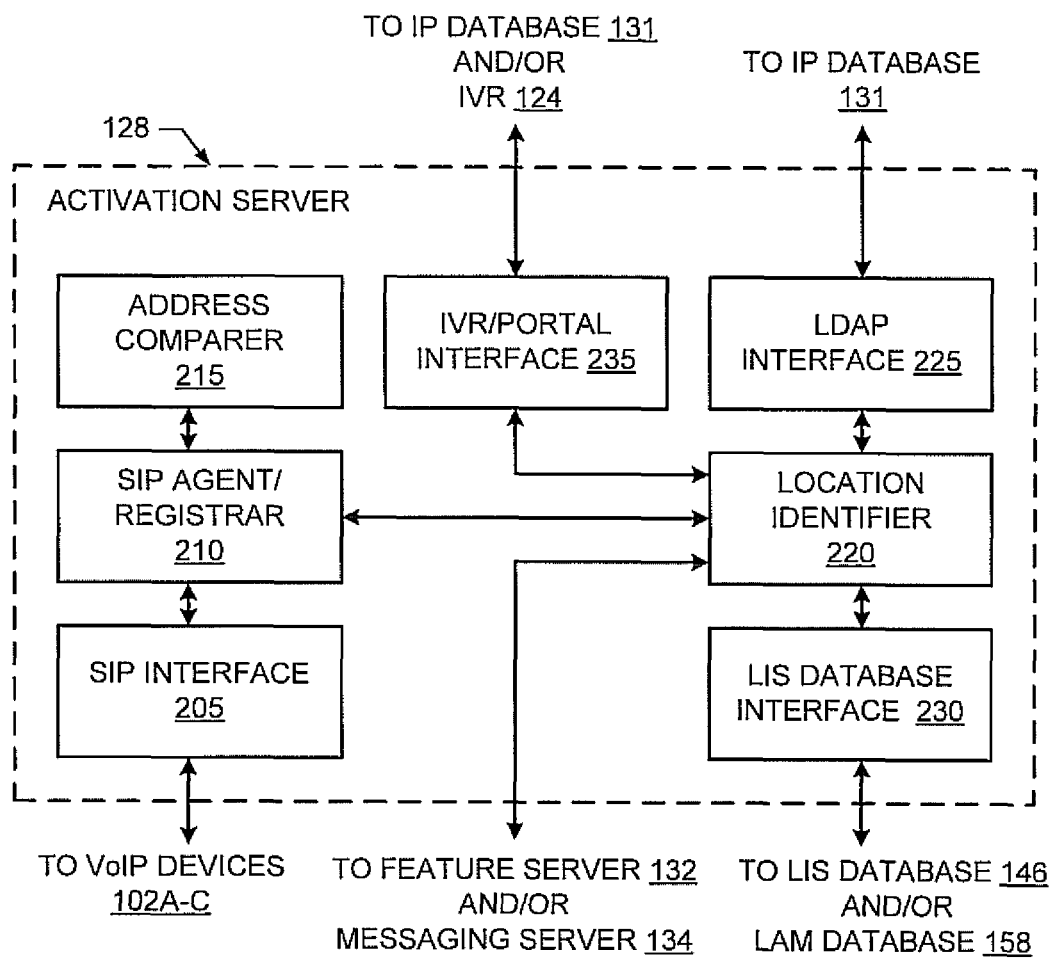
FIG. 2 illustrates an example manner of implementing the example activation server of FIG. 1.

FIG. 2 illustrates an example manner of implementing the example activation server 128 of FIG. 2. To receive, send and/or process SIP messages, the example activation server 128 of FIG. 2 includes any type of protocol message interface 205 (e.g., one implemented in accordance with SIP) and a SIP user agent/registrar 210. The example SIP agent/registrar 210 of FIG. 2 interacts with VoIP devices (e.g., any or all of the example VoIP devices 102A-C of FIG. 1) to register the VoIP devices to a VoIP service network (e.g., the example VoIP service network 112). The example SIP agent/registrar 210 sends, receives and/or exchanges SIP messages with the VoIP devices via the example SIP interface 205. During the registration of a VoIP device, the example SIP agent/registrar 210 receives from the VoIP device its currently assigned IP address and an identifier (e.g., a MAC address) that uniquely identifies the VoIP device.

To determine if a registering VoIP device has changed its geographic location, the example activation server 128 of FIG. 2 includes an address comparer 215. The example address comparer 215 of FIG. 2 compares the IP address currently assigned to a registering VoIP device with the most recent IP address that the SIP registrar 210 has for the registering VoIP device. If the currently assigned IP address is different from the most recent IP address (e.g., they have left a coffee shop hosting a first WiFi hotspot and entered a bookstore hosting a second WiFi hotspot), the example address comparer 215 determines that the registering VoIP device may have changed geographic location.

To determine the current geographic location of a VoIP device, the example activation server 128 of FIG. 2 includes a location identifier 220. The example location identifier 220 of FIG. 2 determines whether the VoIP device is associated with (e.g., has an IP address assigned by) an access network that is owned, operated and/or associated with the service provider that owns, operates and/or is associated with the activation server 128 by performing a query of the example IP database 131 of FIG. 1.

To query the IP database 131, the example activation server 128 of FIG. 2 includes an LDAP interface 225. The example LDAP interface 225 of FIG. 2 performs a query of the example IP database 131 based upon the current IP address assigned to the VoIP device. If the IP address is found in the IP database 131, the example LDAP interface 225 returns the geographic location obtained from the IP database 131 query. If the IP address is not found in the IP database 131, the example LDAP interface 225 returns a no geographic location found indication, which signifies that the VoIP device is currently associated with an access network associated with a different service provider than that associated with the example activation server 128.

If the query of the IP database 131 identifies a known geographic location for the VoIP device, the example location identifier 220 of FIG. 2 automatically provides the geographic location of the VoIP device to a LIS database interface 230. The example LIS database interface 230 of FIG. 2 provides, stores and/or updates the current geographic location of the VoIP device in the example LIS database 146 and/or the example LAM database 158 of FIG. 1. However, if the query of the IP database 131 does not identify a known geographic location for the VoIP device, the example location identifier 220 attempts to obtain a geographic location from the user via an interface 235. The example location identifier 220 also notifies the user of the VoIP device that E911 services cannot be currently provided by, for example, sending one or more notifications (e.g., an instant message, a message waiting indicator, an alert message, etc.) via the example feature server 132 and/or the example message server 134, and prompts them to provide and/or select a geographic location. The example interface 235 of FIG. 2 receives geographic location information, inputs and/or selections from the example portal 122 and/or the example IVR 124 of FIG. 1, and provides the same to the location identifier 220.

While an example manner of implementing the example activation server 128 of FIG. 1 has been illustrated in FIG. 2, one or more of the interfaces, elements, processes and/or devices illustrated in FIG. 2 may be combined, divided, re-arranged, omitted, eliminated and/or implemented in any way. Further, the SIP interface 205, the example SIP registrar 210, the example address comparer 215, the example location identifier 220, the example LDAP interface 225, the example LIS database interface 230, the example IVR/portal interface 235 and/or, more generally, the example activation server 128 may be implemented by hardware, software, firmware and/or any combination of hardware, software and/or firmware. Further still, the example activation server 128 may include interfaces, elements, processes and/or devices instead of, or in addition to, those illustrated in FIG. 2 and/or may include more than one of any or all of the illustrated interfaces, elements, processes and/or devices.

Figure 3:
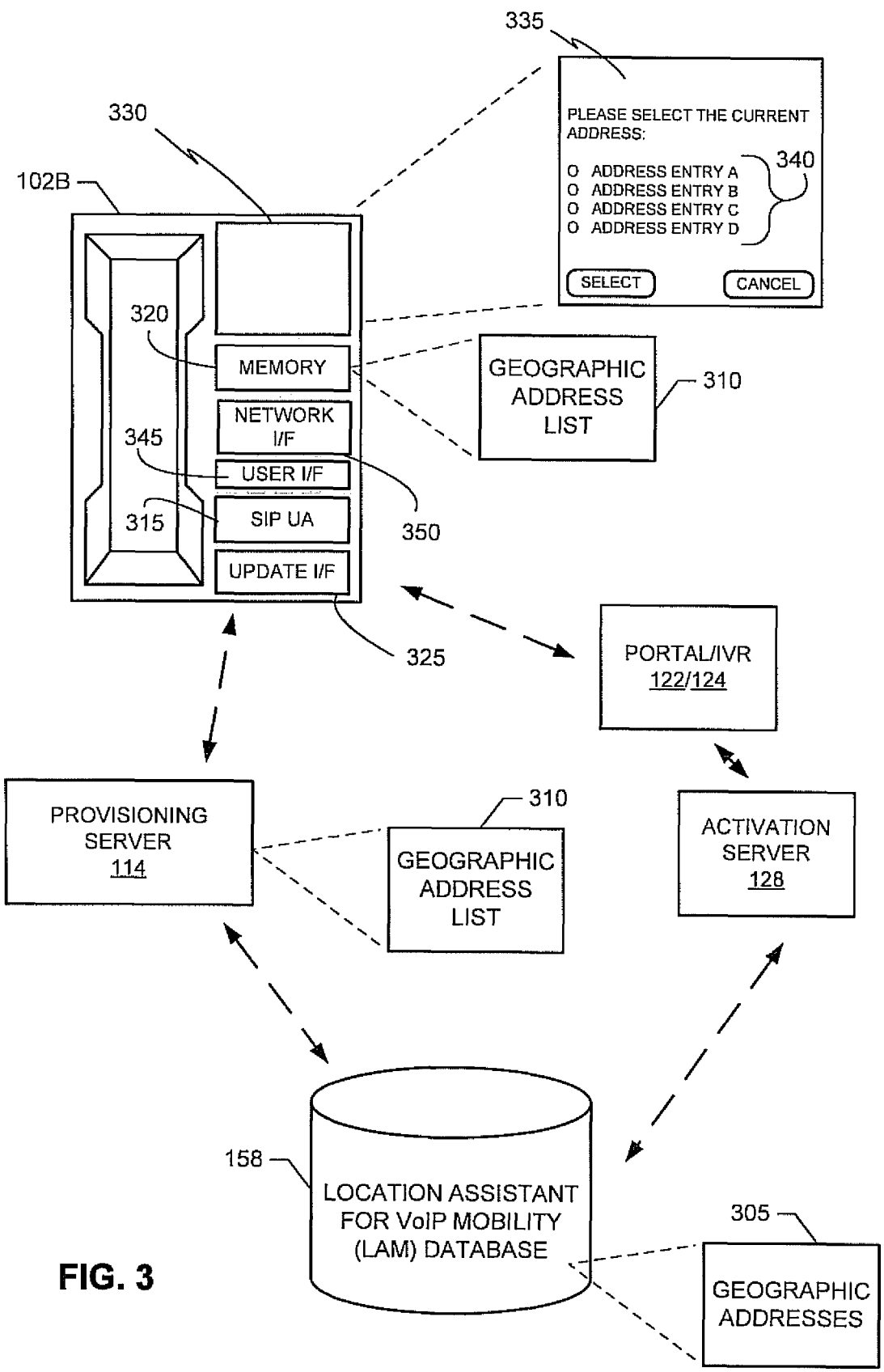
FIG. 3 illustrates an example manner of implementing any or all of the VoIP user devices of FIG. 1.

FIG. 3 illustrates an example manner of implementing any or all of the example VoIP devices 102A-C of FIG. 1. While any or all of the example VoIP devices 102A-C may be represented by the device of FIG. 3, for ease of discussion the example device of FIG. 3 will be referred to as VoIP device 102B.

As illustrated in FIG. 3, the example LAM database 158 (FIG. 1) stores geographic addresses 305, the example provisioning server stores geographic address list 310, and the example VoIP device 102B stores a copy of the geographic address list 310. In the illustrated example, the geographic addresses 305 includes a plurality of geographic address lists 310, each of which corresponds to a particular subscriber account as described below in connection with FIG. 4. A subscriber may add, pre-register and/or pre-populate their geographic address list 310 with geographic locations via the portal 122 and/or the IVR 124. The example LAM database 158 communicates the geographic addresses 305 corresponding to the example VoIP device 102B to the provisioning server 114, and the provisioning server 114 stores the geographic addresses in the geographic address list 310. In turn, the example provisioning server 114 periodically and/or aperiodically communicates the geographic addresses in the geographic address list 310 to the VoIP device 102B.

To implement and/or perform a SIP protocol exchange, the example VoIP device 102B of FIG. 3 includes a SIP user agent (UA) 315. The example SIP UA 315 of FIG. 3 sends, receives and/or processes SIP messages to, among other things, register the VoIP device 102B with a VoIP service network (e.g., the example activation server 128 of the example VoIP service network 112 of FIG. 1), and/or to initiate and/or establish a communication session (e.g., via one of the example CSC 126A, 126B).

To store the example geographic address list 310, the example VoIP device 102B of FIG. 3 includes one or more memories, one of which is designated at reference numeral 320. In the illustrated example of FIG. 3, the example LAM database 158 is configured to communicate the geographic addresses 305 corresponding to different subscribers to the provisioning server 114 after the geographic addresses are provided to the LAM database 158 (e.g., via the example portal 122 and/or the example IVR 124) and validated as MSAG-valid. The example provisioning server 114 of FIG. 3 is configured to communicate geographic address update information to the VoIP device 102B when a geographic address corresponding to the account of the VoIP device 102B is changed, deleted from, or added in the LAM database 158. In some example implementations, the geographic address list 310 is stored in a device configuration file (not shown) in the example memory 320 of the VoIP device 102B. Alternatively, the geographic address list 310 can be stored in a data structure separate from the device configuration file. However, the geographic address list 310 need not be stored at and/or be available at the provisioning server 114 and/or the VoIP device 102B. Instead, a user of the VoIP device 102B may instead interact with the example portal 122 and/or a IVR 124 to select and/or provide geographic location information. Based on one or more user inputs and/or selections, the portal 122 and/or the IVR 124 may interact with the LAM database 158 (directly and/or indirectly via the activation server 128) to access, input, update and/or select a geographic address stored in the geographic address list 305.

To request geographic address updates from the provisioning server 114, the example VoIP device 102B of FIG. 3 includes an update interface 325. The example update interface 325 of FIG. 3 is configured to periodically and/or aperiodically request geographic address updates from the provisioning server 114. The provisioning server 114 responds by communicating one or more (if any) geographic addresses from the list 310 to the VoIP device 102B. However, as described above, the example VoIP device 102B of FIG. 3 need not store the geographic address list 310. Even if the VoIP device 102B does not store the geographic address list 310, the example update interface 325 may be used to request geographic address information stored in the LAM 158 (e.g., via the example portal 122) to facilitate the selection of a geographic location by a user of the VoIP device 102B.

To display information, the example VoIP device 102B of FIG. 3 includes a display 330. Among other things, the example display 330 of FIG. 3 is configured to display one or more geographic addresses stored from the geographic address list 310 and/or received from the LAM 158 (e.g., via a portal 122), and/or to present a user interface (e.g., a text entry box) by which a user of the VoIP device 102B may input geographic location information. In the illustrated example of FIG. 3, the display 330 is displaying an address selection screen 335 that includes a plurality of geographic addresses 340 that are available for selection by a user as the current geographic address at which the VoIP device 102B is being used. The example display 330 of FIG. 3 may, for example, be triggered by the activation server 128 (e.g., via a feature server 132) when the activation server 128 determines that the geographic location of the VoIP device 102B cannot be automatically determined.

To allow the user to provide inputs, the example VoIP device 102B of FIG. 3 includes one or more user interfaces, one of which is designated in FIG. 3 with reference numeral 345. Example user interfaces 345 include, but are not limited to, one or more buttons, one or more dials, one or more soft-keys, a touch screen interface, and/or any other interface.

To communicate an address selection to the LAM database 158, the portal 122 and/or the activation server 128, the example VoIP device 102B of FIG. 3 includes a network interface 350. The example network interface 350 of FIG. 3 is implemented using a hypertext transfer protocol over secure socket layer ("HTTPS") interface to enable the VoIP device to secure communication with the LAM database 158, the provisioning server 114, the example portal 122 and/or the example activation server 128. After the example network interface 350 communicates a provided geographic address or a selected geographic address to the LAM database 158, the activation server 128 can set the geographic address stored therein as the current address for the VoIP device 102B (e.g., by updating the example LIS database 146 of FIG. 1).

While an example manner of implementing any or all of the example VoIP devices 102A-C of FIG. 1 has been illustrated in FIG. 3, one or more of the interface elements, data structures, elements, processes and/or devices illustrated in FIG. 3 may be combined, divided, re-arranged, omitted, eliminated and/or implemented in any way. Further, the example SIP UA 315, the example memory 320, the example update interface 325, the example display 330, the example user interface 345 and/or, more generally, the example VoIP device 102A-C may be implemented by hardware, software, firmware and/or any combination of hardware, software and/or firmware. Further still, the example device 102A-C may include interface elements, data structures, elements, processes and/or devices instead of, or in addition to, those illustrated in FIG. 3 and/or may include more than one of any or all of the illustrated interface elements, data structures, elements, processes and/or devices.

Figure 4:
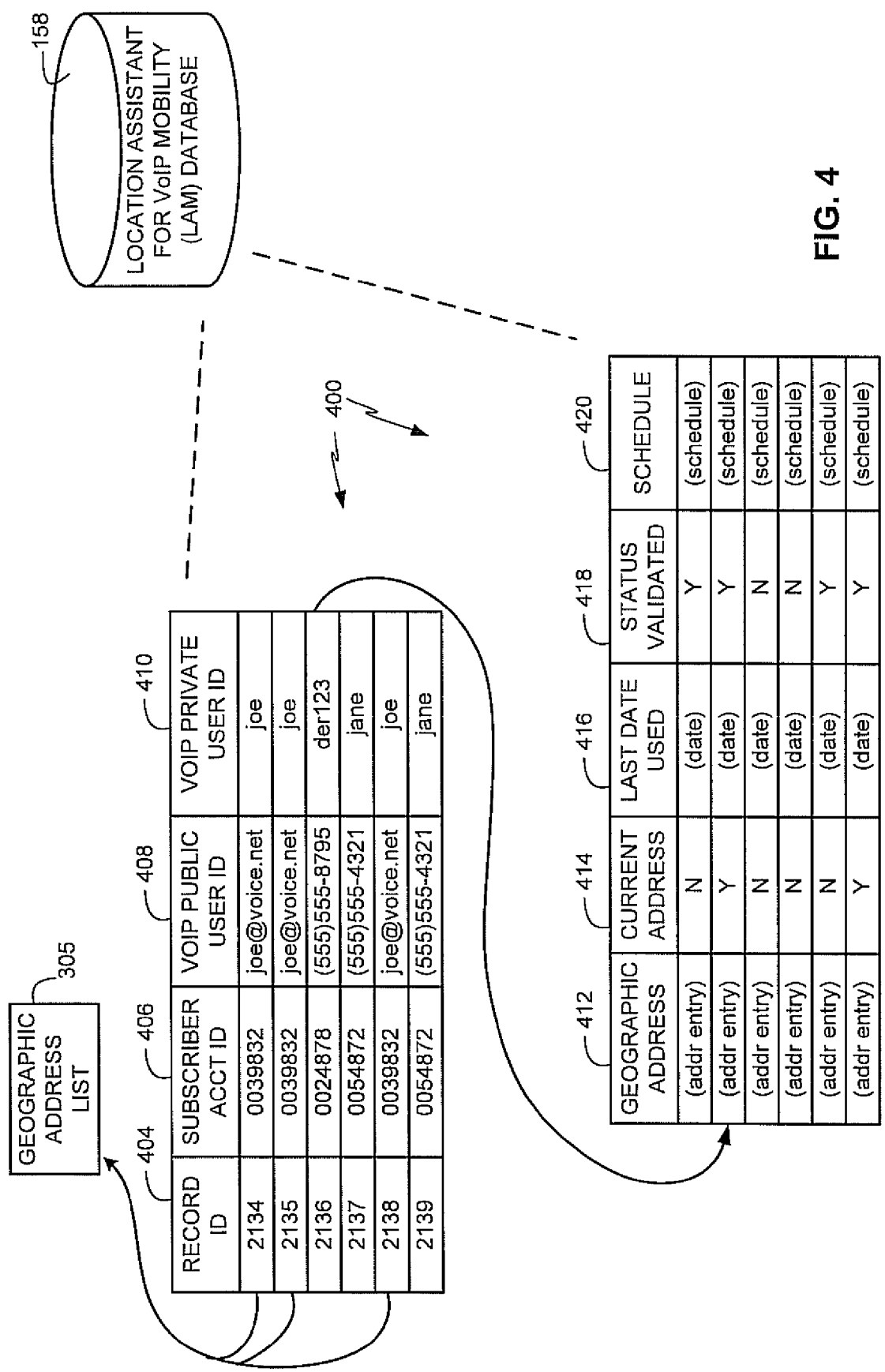
FIG. 4 illustrates an example data structure that may be used to implement the example location assistant for VoIP mobility (LAM) database of FIG. 1.

FIG. 4 illustrates an example data structure 400 that may be used to implement the example LAM database 158 of FIG. 1. The example data structure 400 of FIG. 4 stores the geographic addresses 305 (FIG. 3) that form a plurality of address lists corresponding to a plurality of VoIP subscriber accounts in the LAM database 158. In the illustrated example, the LAM database 158 is configured to store information corresponding to a record ID column 404, a subscriber account ID column 406, a VoIP public user ID column 408, a VoIP private user ID column 410, a geographic address column 412, a current address column 414, a last date used column 416, a status validated column 418, and a schedule column 420. While an example data structure 400 is illustrated in FIG. 4, the example data structure may be implemented using any number and/or type(s) of other and/or additional fields and/or data. Further, the fields and/or data illustrated in FIG. 4 may be combined, divided, re-arranged, eliminated and/or implemented in any way. Moreover, the example data structure may include fields and/or data in addition to, or instead of, those illustrated in FIG. 4 and/or may include more than one of any or all of the illustrated fields and/or data.

The example record ID column 404 of FIG. 4 indicates the record number for a particular data record in the data structure 400. The example subscriber account ID column 406 of FIG. 4 indicates the account ID of the subscriber to which a particular entry corresponds. The plurality of address lists stored in the data structure 400 are identified by the subscriber account ID's. An example subscriber account ID 406 is a MAC address of a VoIP device associated with the subscriber. That is, an address list corresponding to a particular subscriber includes the geographic addresses stored in the data structure in association with the account ID of that particular subscriber.

The example VoIP public user ID column 408 of FIG. 4 stores one or more public user identifiers (e.g., telephone numbers) assigned to subscriber accounts. The example VoIP private user ID column 410 of FIG. 4 stores VoIP private user ID's. A VoIP user ID is a private identifier that is assigned to a user subscription associated with a VoIP device 102A-C by a home network operator that provides VoIP services. The VoIP user ID can be used for registration, authorization, administration, and accounting purposes. The example geographic address column 412 of FIG. 4 stores geographic addresses provided by subscribers. In the illustrated example, one geographic address is stored in each data record of the data structure 400.

The example current address column 414 of FIG. 4 stores YES/NO flag values to indicate whether geographic addresses stored in the geographic address column 412 are set as a current address. In the illustrated example, setting a flag value in the current address column 414 to YES for a particular data record triggers an update process to update the current address for a corresponding VoIP device in the LIS database 146 of FIG. 1. In this manner, the LIS database 146 has the current geographic address at which a VoIP device is being used, and the LIS database 146 can use the geographic address to provide current address information for use with E911 emergency services.

For each data record, the example last date used column 416 of FIG. 4 stores a most recent date on which a corresponding geographic address was set as the current address. For each data record, the example status validated column 418 of FIG. 4 stores a YES/NO flag value to indicate whether a corresponding geographic address has been validated to be MSAG-valid. As shown, some data records contain a NO flag value in the example status validated column 418 to indicate that the corresponding addresses have not been validated or are not valid. The data structure 400 is configured to store the invalid data records to allow users to access the addresses to correct, replace, or delete the addresses.

In the illustrated example, the example schedule column 420 stores schedule information that indicates subscriber-provided days and/or times on which corresponding geographic addresses should be automatically set to current addresses. That is, the schedule column 420 enables a subscriber to configure the LAM database 158 to automatically select a geographic address as a current address for the VoIP device 102A-C of that subscriber. For example, if the subscriber has a recurring traveling schedule to the same geographic locations, instead of manually selecting a current geographic address each time the subscriber registers the VoIP device 102A-C at one of the different geographic locations, the subscriber can provide scheduled dates and/or date ranges that are stored in the example schedule column 420 and elect to have the LAM database 158 automatically select current addresses based on the provided schedule information. Additionally or alternatively, a user of a VoIP device 102A-C may be prompted to confirm a location change corresponding to a scheduled time and/or date. Geographic location information corresponding to scheduled times, dates and/or date ranges may be provided, updated, activated and/or managed via the example portal 122 and the example IVR 124 of FIG. 1.

In the illustrated example of FIG. 4, when a subscriber provides a new geographic address, a new data record is created in the data structure 400 and the account ID of that subscriber is stored in the example subscriber account ID column 406 for the new data record. To generate the geographic address list 305, the LAM database 158 is configured to search the data structure 400 for data records associated with the subscriber account ID corresponding to the VoIP device 102A-C and compile the geographic address entries from those data records into the geographic address list 305.

While an example data structure 400 that may be used to implement the example LAM database 158 of FIG. 1 is illustrated in FIG. 4, the example data structure 400 of FIG. 4 may be implemented using any number and/or type(s) of other and/or additional entries, fields and/or data. Further, the entries, fields and/or data illustrated in FIG. 4 may be combined, divided, re-arranged, eliminated and/or implemented in any way. For example, the VoIP public user ID 408 and/or the VoIP private user ID field 410 may be eliminated. Moreover, the example data structure 400 may include entries, fields and/or data instead of, and/or in addition to, those illustrated in FIG. 4, and/or may include more than one of any or all of the illustrated entries, fields and/or data.

Figure 5:
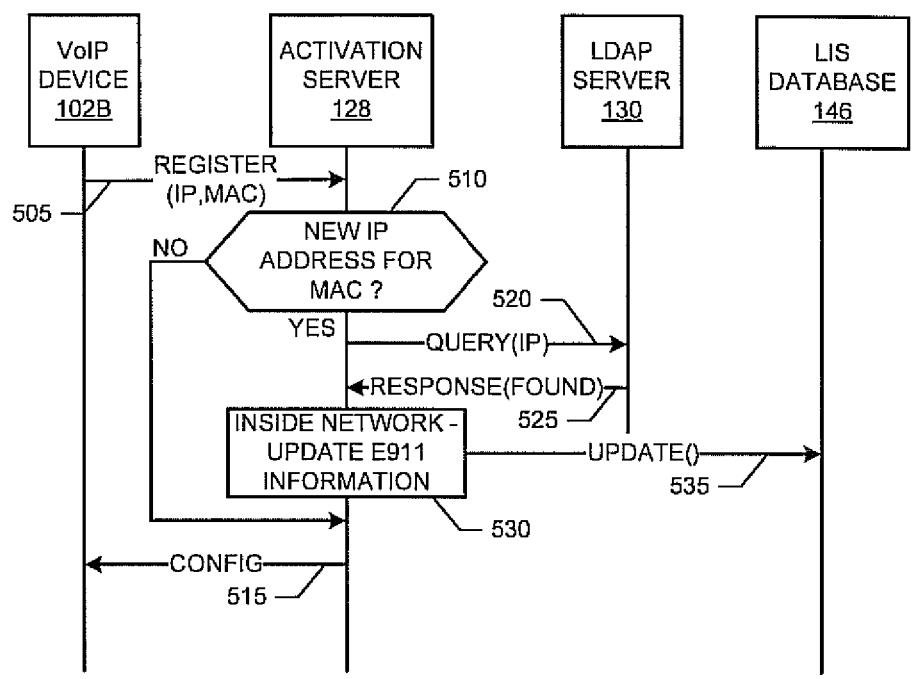
FIGS. 5 and 6 illustrates example protocol message exchanges and flowcharts representative of machine accessible instructions that may be executed to implement any or all of the example activation servers, the example VoIP devices, the example feature server, the example messaging server, the example IVR, the example Portal and/or, more generally, the example VoIP communication system of FIGS. 1-3.
Figure 6:
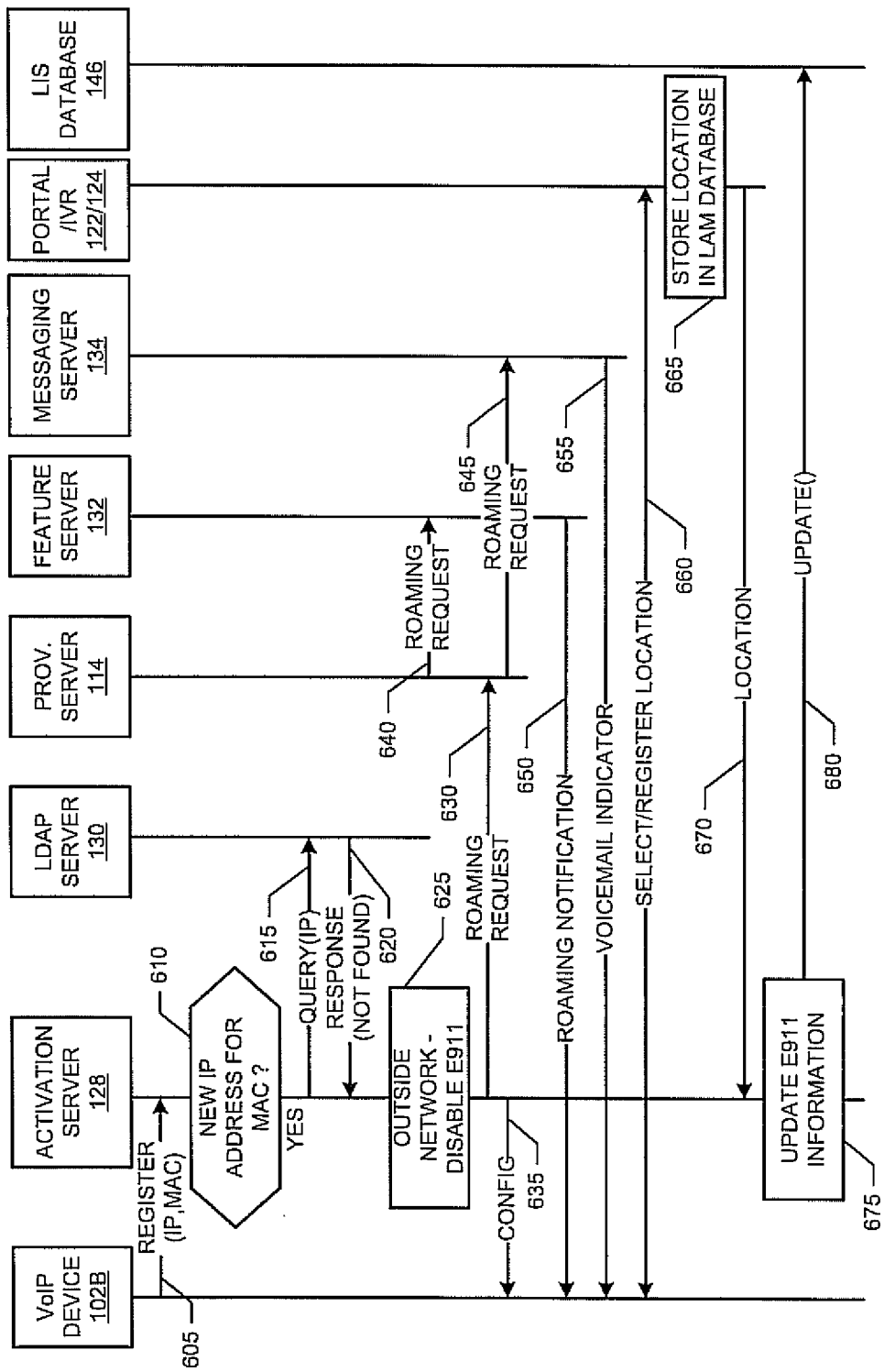

FIGS. 5 and 6 illustrate example protocol message exchanges, and flowcharts representative of machine accessible instructions that may be executed to implement the example VoIP devices 102A-C, the example activation server 128, the example LDAP server 130, the example provisioning server 114, the example feature server 132, the example messaging server 134, the example portal 122, the example IVR 124, the example LIS database 145 and/or, more generally, the example VoIP service network 112 of FIGS. 1-4. The example exchanges of FIGS. 5 and 6 occur subsequent to an initial VoIP device registration that is carried out to activate one or more VoIP services to a particular VoIP device 102A-B. Initial VoIP device registrations, among other things, collect subscriber information, establish a payment method for the VoIP services, validate the MAC address of the VoIP device 102A-B, establish an initial IP address for the VoIP device 102A-B and/or establish an initial geographic location for the VoIP device 102A-B. The example exchanges and/or the example machine accessible instructions of FIGS. 5 and/or 6 may be carried out by a processor, a controller and/or any other suitable processing device. For example, the example exchanges and/or the example machine accessible instructions of FIGS. 5 and/or 6 may be embodied in coded instructions stored on a tangible medium such as a flash memory, a read-only memory (ROM) and/or random-access memory (RAM) associated with a processor (e.g., the example processor 805 discussed below in connection with FIG. 8). Alternatively, some or all of the example exchanges and/or the example machine accessible instructions of FIGS. 5 and/or 6 may be implemented using any combination(s) of application specific integrated circuit(s) (ASIC(s)), programmable logic device(s) (PLD(s)), field programmable logic device(s) (FPLD(s)), discrete logic, hardware, firmware, software, etc. Also, some or all of the example exchanges and/or the example machine accessible instructions of FIGS. 5 and/or 6 may be implemented manually or as any combination(s) of any of the foregoing techniques, for example, any combination of firmware, software, discrete logic and/or hardware. Persons of ordinary skill in the art will readily appreciate that many other methods of implementing the example VoIP devices 102A-C, the example activation server 128, the example LDAP server 130, the example provisioning server 114, the example feature server 132, the example messaging server 134, the example portal 122, the example IVR 124, the example LIS database 145 and/or, more generally, the example VoIP service network 112 of FIGS. 1-4 may be employed. For example, the order of execution of the blocks of the example flowcharts and/or the example exchanges of FIGS. 5 and/or 6 may be changed, and/or some of the blocks and/or exchanges described may be changed, eliminated, sub-divided, and/or combined. Additionally, persons of ordinary skill in the art will appreciate that any or all of the example exchanges and/or the example machine accessible instructions of FIGS. 5 and/or 6 may be carried out sequentially and/or carried out in parallel by, for example, separate processing threads, processors, devices, discrete logic, circuits, etc.

The example protocol message exchanges of FIG. 5 begin with the example calling VoIP device 102B sending a registration request message 505 (e.g., a SIP REGISTER message) to the activation server 128. The example registration request message 505 of FIG. 5 includes, among other things, the current IP address assigned to the VoIP device 102B as well as a unique identifier for the VoIP device 102B (e.g., a MAC address).

When the activation server 128 receives the registration request message 505, the activation server 128 (e.g., the example address comparer 215 of FIG. 2) compares the current IP address of the VoIP device 102B with the most recent IP address for the VoIP device 102B (block 510). If the IP address assigned to the VoIP device 102B has not changed (block 510), the activation server 128 completes the registration of the VoIP device 102B (not shown), and sends a device configuration file 515 to the VoIP device 102B.

Returning to block 510, if the current and the most recent IP address for the VoIP device 102B do not match (block 510), the activation server 128 (e.g., the example location identifier 220 via the example LDAP interface 225 of FIG. 2) queries 520 the LDAP server 130 to determine if the current IP address has an associated geographic location. In the illustrated example of FIG. 5, the LDAP server 130 locates a geographic location associated with the IP address and returns a response 525 containing the geographic location to the activation server 128.

When the activation server 128 receives the geographic location 525 from the LDAP server 130, the location identifier determines that the VoIP device 102B is using an access network that is owned, operated and/or associated by the service provider that owns, operates and/or is associated with the activation server 128, and enables E911 services for the VoIP device 102B (block 530) by updating 535 the geographic location of the VoIP device 102B in the LIS database 146. The activation server 128 then completes the registration of the VoIP device 102B (not shown), and sends the device configuration file 515 to the VoIP device 102B.

The example protocol message exchanges of FIG. 6 begin with the example calling VoIP device 102B sending a registration request message 605 (e.g., a SIP REGISTER message) to the activation server 128. The example registration request message 605 of FIG. 6 includes, among other things, the current IP address assigned to the VoIP device 102B as well as a unique identifier for the VoIP device 102B (e.g., a MAC address).

When the activation server 128 receives the registration request message 605, the activation server 128 (e.g., the example address comparer 215 of FIG. 2) compares the current IP address of the VoIP device 102B with the most recent IP address for the VoIP device 102B (block 610). For ease of illustration, only the scenario where the current and most recent IP address for the VoIP device 102B do not match (block 610) is illustrated in FIG. 6. The scenario where the current and most recent IP address match is described fully above in connection with FIG. 5.

The activation server 128 (e.g., the example location identifier 220 via the example LDAP interface 225 of FIG. 2) queries 615 the LDAP server 130 to determine if the current IP address has an associated geographic location. In the illustrated example of FIG. 6, the LDAP server 130 does not locate a geographic location associated with the IP address and, thus, returns a response 620 indicating that the IP address was not found.

Because the activation server 128 receives the example not found response 620 from the LDAP server 130, the location identifier determines that the VoIP device 102B is not using an access network that is owned, operated and/or associated by the service provider that owns, operates and/or is associated with the activation server 128 and, thus, the activation server 128 disables E911 services for the VoIP device 102B (block 625). The activation server 128 then notifies 630 the provisioning server 114 that the VoIP device 102B is roaming, and sends the device configuration file 635 to the VoIP device 102B.

When notified 630 by the activation server 128, the provisioning server 114 notifies 640 the feature server 132 and notifies 645 the messaging server 134 that the VoIP device 102B is roaming. In response to the roaming notification 640, the feature server 132 sends a notification 650 to the VoIP device 102B notifying the user of the VoIP device 102B that the geographic location of the VoIP device 102B is not known and, thus, E911 services are currently disabled. An example notifications 650 include, but are not limited to, a service alert and/or a text message. Likewise, in response to the roaming notification 645, the messaging server 134 sends a message waiting notification 655 to the VoIP device 102B notifying a user of the VoIP device 102B that the geographic location of the VoIP device 102B is not known and, thus, E911 services are currently disabled.

The VoIP device 102B and/or the user of the VoIP device 102B interact 660 with a portal 122 and/or an IVR 124 to provide, input, register and/or select a geographic location. When the portal 122/IVR 124 receives a geographic location input and/or selection from the VoIP device 102B and/or the user of the VoIP device 102B, the portal 122/IVR 124 stores the current geographic location in the LAM database 158 (block 656) and provides the geographic location 670 to the activation server 128.

In response to the geographic location 670, the activation server 128 enables E911 services for the VoIP device 102B (block 675) by updating 680 the geographic location of the VoIP device 102B in the LIS database 146. If the example feature server 132 is implementing and/or enforcing a restricted operating mode for the VoIP device 102B (e.g., because valid geographic location information for the VoIP device 102B has not been established), the example activation server 128 may notify the feature server 132 (not shown) that full operating capabilities for the VoIP device 102B can be activated and/or re-enabled.

Figure 7:
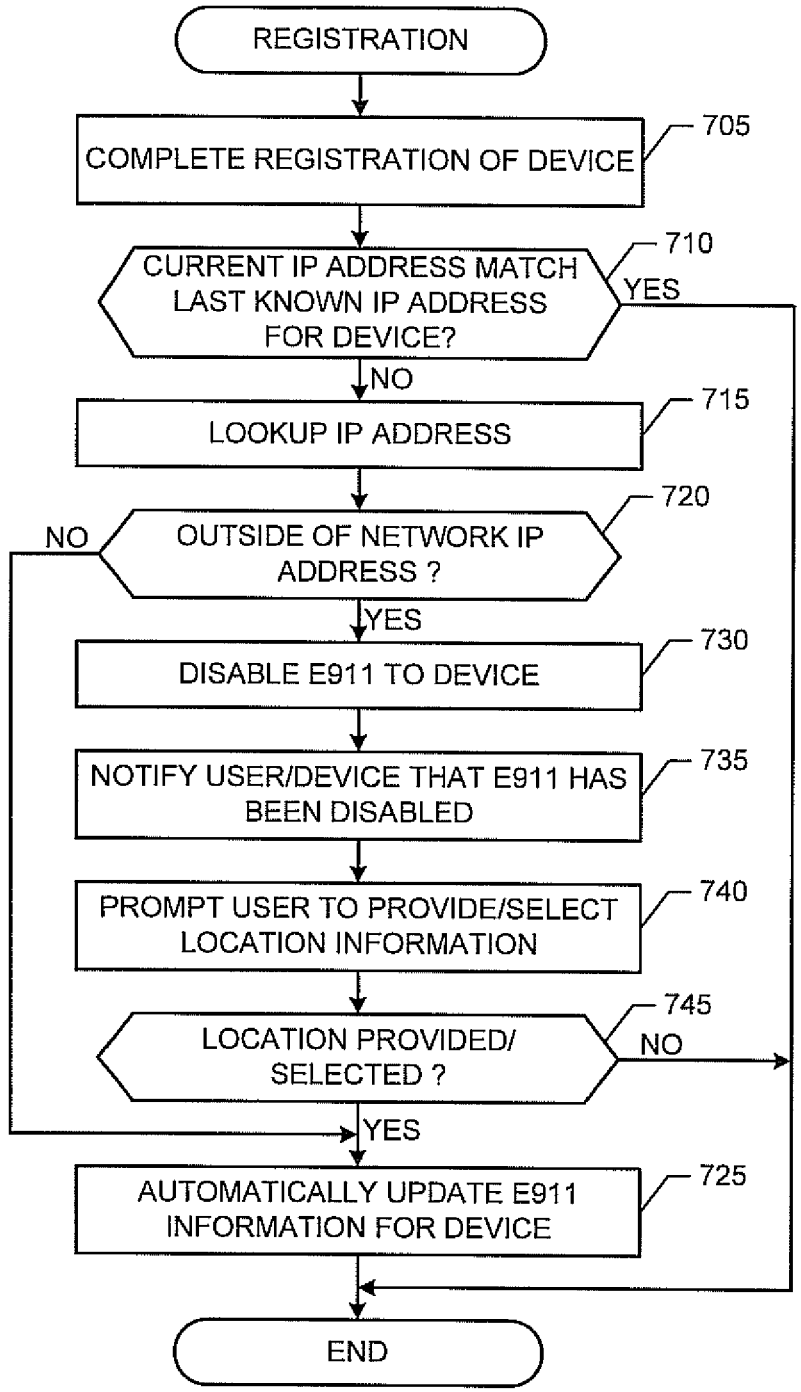
FIG. 7 illustrates example machine accessible instructions that may be executed to implement any or all of the example activation servers of FIGS. 1-2.

FIG. 7 illustrates example machine accessible instructions that may be executed to implement any or all of the example activation servers 128 described herein. The example machine accessible instructions of FIG. 7 may be carried out by a processor, a controller and/or any other suitable processing device. For example, the example machine accessible instructions of FIG. 7 may be embodied in coded instructions stored on a tangible medium such as a flash memory, a ROM and/or RAM associated with a processor (e.g., the example processor 805 discussed below in connection with FIG. 8). Alternatively, some or all of the example machine accessible instructions of FIG. 7 may be implemented using any combination(s) of ASIC(s), PLD(s), FPLD(s), discrete logic, hardware, firmware, etc. Also, some or all of the example machine accessible instructions of FIG. 7 may be implemented manually or as any combination of any of the foregoing techniques, for example, any combination of firmware, software, discrete logic and/or hardware. Further, although the example machine accessible instructions are described with reference to the flowchart of FIG. 7, persons of ordinary skill in the art will readily appreciate that many other methods of implementing the machine accessible instructions of FIG. 7 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIG. 7 may be carried out sequentially and/or carried out in parallel by, for example, separate processing threads, processors, devices, discrete logic, circuits, etc.

The example machine accessible instructions of FIG. 7 begin when an activation server (e.g., the example activation server 128 of FIG. 1) receives a registration request message (e.g., a SIP REGISTER message) from a VoIP device (e.g., any of the example VoIP devices 102A-C). The activation server (e.g., the example SIP agent/registrar 210 of FIG. 2) handles the registration of the VoIP device as is traditional (block 705). If the activation server (e.g., the example address comparer 215) determines that the current IP address of the VoIP device (e.g., received in the registration request message) is the same as the most recent IP address of the VoIP device (block 710), control exits from the example machine accessible instructions of FIG. 7.

If the current and most recent IP address do not match (block 710), the activation server (e.g., the LDAP interface 225 of FIG. 2) performs a lookup (e.g., of the example IP database 131 of FIG. 1) based on the current IP address (block 715). The activation server (e.g., the example location identifier 220) determines whether the IP address is an outside of network IP address (e.g., associated with an access network that is not operated, owned and/or associated with the service provider that owns, operates and/or is associated with the activation server) or an inside of network IP address (block 720). If the current IP address is an inside of network IP address (e.g., it has an associated geographic location) (block 720), the activation server (e.g., the example LIS database interface 230) updates E911 information for the VoIP device based on the automatically determined geographic location (block 725). Control then exits from the example machine accessible instructions of FIG. 7.

Returning to block 720, if the current IP address of the VoIP device is an outside of network IP address (block 720), the activation server disables E911 services for the VoIP device (block 730), notifies a user of the VoIP device that E911 services are currently disabled (block 735), and prompts the user of the VoIP device to provide and/or select a current geographic location (block 740).

If a geographic location is selected and/or provided (block 745), the activation server (e.g., the example LIS database interface 230) updates E911 information for the VoIP device based on the automatically determined geographic location (block 725). Control then exits from the example machine accessible instructions of FIG. 7. If a geographic location is not selected nor provided (block 745), control exits from the example machine accessible instructions of FIG. 7 without enabling E911 services for the VoIP device.

Figure 8:
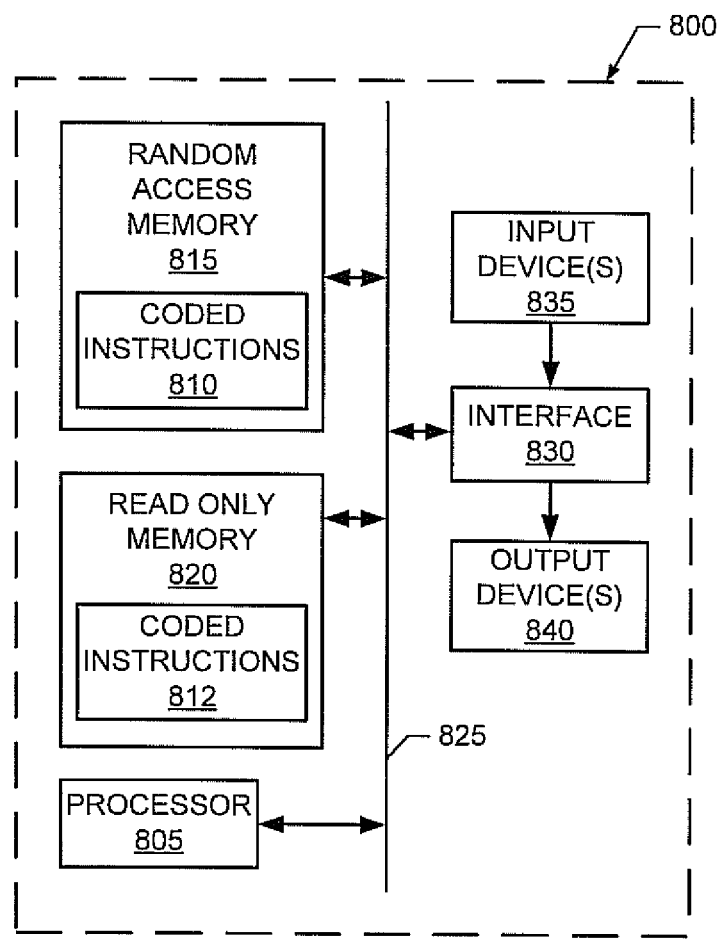
FIG. 8 is a schematic illustration of an example processor platform that may be used and/or programmed to carry out the example message exchanges and/or the example machine accessible instructions of FIGS. 5-7 to implement any of all of the example methods and apparatus described herein.

FIG. 8 is a schematic diagram of an example processor platform 800 that may be used and/or programmed to implement all or a portion of any or all of the example VoIP devices 102A-C, the example activation server 128, the example LDAP server 130, the example provisioning server 114, the example feature server 132, the example messaging server 134, the example portal 122, the example IVR 124, the example LIS database 145 and/or, more generally, the example VoIP service network 112 of FIGS. 1-4. For example, the processor platform 800 can be implemented by one or more general purpose processors, processor cores, microcontrollers, etc.

The processor platform 800 of the example of FIG. 8 includes at least one general purpose programmable processor 805. The processor 805 executes coded instructions 810 and/or 812 present in main memory of the processor 805 (e.g., within a RAM 815 and/or a ROM 820). The processor 805 may be any type of processing unit, such as a processor core, a processor and/or a microcontroller. The processor 805 may execute, among other things, the example protocol message exchanges and/or the example machine accessible instructions of FIGS. 5, 6 and/or 7 to implement the example methods and apparatus described herein.

The processor 805 is in communication with the main memory (including a ROM 820 and/or the RAM 815) via a bus 825. The RAM 815 may be implemented by DRAM, SDRAM, and/or any other type of RAM device, and ROM may be implemented by flash memory and/or any other desired type of memory device. Access to the memory 815 and 820 may be controlled by a memory controller (not shown).

The processor platform 800 also includes an interface circuit 830. The interface circuit 830 may be implemented by any type of interface standard, such as an external memory interface, serial port, general purpose input/output, etc. One or more input devices 835 and one or more output devices 840 are connected to the interface circuit 830. The input devices 835 and/or output devices 840 may be used to, for example, implement the example SIP interface 205, the example LDAP interface 225, the example LIS database interface 230 and/or the example IVR/portal interface 235.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    detecting when a voice over Internet protocol device is inside an access network by determining the voice over Internet protocol device is inside the access network if a media access control address of the voice over Internet protocol device was previously associated with an Internet protocol address that is currently associated with the voice over Internet protocol device;
    when the media access control address was not previously associated with the Internet protocol address that is currently associated with the voice over Internet protocol device, determining the voice over Internet protocol device is inside the access network if the Internet protocol address is listed in a database of Internet protocol addresses associated with the access network;
    prompting a user of the voice over Internet protocol device to provide geographic location information for the voice over Internet protocol device when both (1) the media access control address was not previously associated with the Internet protocol address and (2) when the Internet protocol address is not listed in the database of Internet protocol addresses; and
    updating enhanced 911 information for the voice over Internet protocol device based on the geographic location information.

2. A method as defined in claim 1, wherein the voice over Internet protocol device is outside the access network when the voice over Internet protocol device is not communicatively coupled to a voice over Internet protocol service network via the access network, the voice over Internet protocol service network to provide a voice over Internet protocol service to the voice over Internet protocol device.

3. A method as defined in claim 2, wherein the access network is operated by a service provider operating the voice over Internet protocol service network.

4. A method as defined in claim 2, wherein the voice over Internet protocol device is communicatively coupled to the voice over Internet protocol service network via a second access network when the voice over Internet protocol device is outside the access network, and wherein the Internet protocol address is assigned by the second access network.

5. A method as defined in claim 4, wherein the second access network is operated by a different service provider.

6. A method as defined in claim 1, wherein updating enhanced 911 information for the voice over Internet protocol endpoint is performed without prompting the user of the voice over Internet protocol device to provide the geographic location information.

7. A method as defined in claim 1, wherein the voice over Internet protocol device is inside the access network when the voice over Internet protocol device is communicatively coupled to a voice over Internet protocol service network via the access network, the voice over Internet protocol service network to provide a voice over Internet protocol service to the voice over Internet protocol device.

8. A method as defined in claim 1, further comprising adding the Internet protocol address and the geographic location information to the database of Internet protocol addresses.

9. A method as defined in claim 1, wherein determining whether the Internet protocol address is listed in the database of Internet protocol addresses comprises performing a lightweight directory access protocol query.

10. A method as defined in claim 1, further comprising updating enhanced 911 information for the voice over Internet protocol endpoint automatically based on the media access control address and the Internet protocol address when the Internet protocol address is listed in the database of Internet protocol addresses.

11. A method as defined in claim 1, wherein the database of Internet protocol addresses includes known roaming locations.

12. A method as defined in claim 1, wherein the Internet protocol address and the media access control address are received during a voice over Internet protocol device registration.

13. A method as defined in claim 1, further comprising receiving the geographic location information from the voice over Internet protocol device.

14. A method as defined in claim 13, wherein the geographic location information is received via at least one of an interactive voice response system or a web-based interface.

15. A method as defined in claim 1, wherein the enhanced 911 information for the voice over Internet protocol endpoint enables determination of a geographic location of the voice over Internet protocol device.

16. An apparatus comprising:
a processor; and
a memory comprising machine readable instructions that, when executed by the processor, cause the processor to perform operations comprising:
detecting when a voice over Internet protocol device is inside an access network by determining a voice over Internet protocol device is inside the access network if a media access control address of the voice over Internet protocol device was previously associated with an Internet protocol address that is currently associated with the voice over Internet protocol device;
when the media access control address of the voice over Internet protocol device was not previously associated with the Internet protocol address that is currently associated with the voice over Internet protocol device, determining the voice over Internet protocol device is inside the access network if the Internet protocol address is listed in a database of Internet protocol addresses associated with the access network;
prompting a user of the voice over Internet protocol device to provide geographic location information for the voice over Internet protocol device when both (1) the media access control address was not previously associated with the Internet protocol address and (2) when the Internet protocol address is not listed in the database of Internet protocol addresses; and
updating enhanced 911 information for the voice over Internet protocol device based on the geographic location information.

17. An apparatus as defined in claim 16, further comprising a protocol messaging interface including a session initiation protocol interface.

18. An apparatus as defined in claim 16, wherein the voice over Internet protocol device is outside the access network when the voice over Internet protocol device is not communicatively coupled to a voice over Internet protocol service network via the access network, the voice over Internet protocol service network to provide a voice over Internet protocol service to the voice over Internet protocol device.

19. An apparatus as defined in claim 18, wherein the voice over Internet protocol device is communicatively coupled to the voice over Internet protocol service network via a second access network when the voice over Internet protocol device is outside the access network, and the Internet protocol address is assigned by the second access network.

20. An apparatus as defined in claim 19, wherein the access network and the second access network are operated by different service providers.

21. An apparatus as defined in claim 16, wherein the operations further comprise updating E911 information for the voice over Internet protocol endpoint automatically based on the media access control address and the Internet protocol address when the voice over Internet protocol device is inside the access network without prompting the user of the voice over Internet protocol device to provide the geographic location information.

22. An apparatus as defined in claim 21, wherein the voice over Internet protocol device is inside the access network when the voice over Internet protocol device is communicatively coupled to a voice over Internet protocol service network via the access network, the voice over Internet protocol service network to provide a voice over Internet protocol service to the voice over Internet protocol device.

23. An apparatus as defined in claim 16, further comprising a lightweight directory access protocol server interface.

24. An apparatus as defined in claim 16, further comprising an interface to provide at least one of an interactive voice response system or a web-based interface.

25. A tangible machine readable storage device comprising machine readable instructions which, when executed, cause a logic circuit to at least:
detect when a voice over Internet protocol device is inside an access network by determining the voice over Internet protocol device is inside the access network if a media access control address of the voice over Internet protocol device was previously associated with an Internet protocol address that is currently associated with the voice over Internet protocol device;
when the media access control address was not previously associated with the Internet protocol address that is currently associated with the voice over Internet protocol device, determine the voice over Internet protocol device is inside the access network if the Internet protocol address is listed in a database of Internet protocol addresses associated with the access network;
prompt a user of the voice over Internet protocol device to provide geographic location information for the voice over Internet protocol device when both (1) the media access control address was not previously associated with the Internet protocol address and (2) when the Internet protocol address is not listed in the database of Internet protocol addresses; and
update enhanced 911 information for the voice over Internet protocol device based on the geographic location information.

* * * * *